United States Patent [19]
Roy et al.

[11] Patent Number: 5,244,849
[45] Date of Patent: * Sep. 14, 1993

[54] METHOD FOR PRODUCING TRANSPARENT POLYCRYSTALLINE BODY WITH HIGH ULTRAVIOLET TRANSMITTANCE

[75] Inventors: Donald W. Roy, Golden; James L. Hastert, Lakewood; Lawrence E. Coubrough, Arvada; Kenneth E. Green, Arvada; Aurelio Trujillo, Arvada, all of Colo.

[73] Assignee: Coors Porcelain Company, Golden, Colo.

[*] Notice: The portion of the term of this patent subsequent to Jan. 8, 2008 has been disclaimed.

[21] Appl. No.: 47,428

[22] Filed: May 6, 1987

[51] Int. Cl.$^5$ .................................. C04B 35/02
[52] U.S. Cl. ........................... 501/120; 264/1.2; 264/65; 264/570; 501/153
[58] Field of Search ............ 264/65, 570, 1.2; 501/120, 153

[56] References Cited

U.S. PATENT DOCUMENTS

| | | |
|---|---|---|
| 3,026,210 | 3/1962 | Coble ................ 106/39 |
| 3,186,906 | 6/1964 | Falckenberg . |
| 3,239,322 | 3/1966 | Carter . |
| 3,294,878 | 12/1966 | Carnall, Jr. et al. ........... 264/1 |
| 3,392,056 | 7/1968 | Maskalick . |
| 3,431,326 | 3/1969 | Letter ........................ 264/1 |
| 3,530,209 | 9/1970 | Ho ........................... 264/65 |
| 3,531,308 | 9/1970 | Rangley ................... 106/62 |
| 3,589,880 | 6/1971 | Clark ......................... 65/18 |
| 3,676,211 | 7/1972 | Kourtesis . |
| 3,768,990 | 10/1973 | Sellers et al. ............. 65/18 |
| 3,853,973 | 12/1974 | Hardtl et al. ............ 264/65 |
| 3,875,277 | 4/1975 | Bratton et al. ........... 264/65 |
| 3,950,504 | 4/1976 | Belding et al. .......... 423/600 |
| 3,974,249 | 8/1976 | Roy et al. ............... 264/65 |
| 4,009,042 | 2/1977 | Rittler .................... 106/39.7 |
| 4,047,960 | 9/1977 | Reade .................... 106/39.8 |
| 4,049,582 | 9/1977 | Erickson et al. . |
| 4,056,457 | 11/1977 | Vossen, Jr. . |
| 4,066,481 | 1/1978 | Manasevit et al. . |
| 4,078,711 | 3/1978 | Bell et al. . |
| 4,146,379 | 3/1979 | Copley et al. . |
| 4,147,584 | 4/1979 | Garrison et al. . |
| 4,191,577 | 3/1980 | Buescher et al. . |
| 4,263,374 | 4/1981 | Glass et al. . |
| 4,269,651 | 5/1981 | Glass et al. . |
| 4,273,587 | 6/1981 | Oda et al. ............... 264/65 |
| 4,296,065 | 10/1981 | Ishii et al. ............ 264/325 |

(List continued on next page.)

OTHER PUBLICATIONS

M. E. Thomas et al., "Infrared Transmission Properties of Sapphire, Spinel, and Yttria as a Function of Temperature," SPIE vol. 683, pp. 41–48 (1986).

J. A. Cox, et al., "Comparative Study of Advanced IR Transmissive Materials," SPIE, vol. 683 (1986).

R. L. Gentilman, "Current and Emerging Materials for 3–5 Micron IR Transmission," SPIE, vol. 683, pp. 2–11 (1986).

P. C. Archibald, et al., "Optical Measurements on Advanced Performance Domes," SPIE, vol. 505 (1984).

"Techbits," vol. 66-2, pp. 11–14, Kodak Periodical, p. 3, pp. 11–12 (1966).

(List continued on next page.)

Primary Examiner—James Derrington
Attorney, Agent, or Firm—Sheridan Ross & McIntosh

[57] ABSTRACT

A method for producing a transparent polycrystalline magnesia-alumina spinel body having high ultraviolet transmissivity and high strength and hardness characteristics is provided. A closed porosity body is formed from a spinel powder preferably having at least minimum purity characteristics. The closed porosity body can be formed by techniques including hot pressing and pressureless sintering. The closed porosity body is subjected to a hot isostatic pressure treatment to reduce residual porosity. The resulting body has high transmissivity of electro-magnetic radiation in the range between about 0.2 microns and about 6 microns and is resistant to abrasion or erosion, has high strength, and does not substantially deteriorate after exposure to ultraviolet light.

30 Claims, 11 Drawing Sheets

U.S. PATENT DOCUMENTS

| | | | |
|---|---|---|---|
| 4,304,461 | 12/1981 | Stewart et al. | |
| 4,316,936 | 2/1982 | Hing | |
| 4,347,210 | 8/1982 | Maguire | 264/1.2 |
| 4,401,767 | 7/1983 | Dietz et al. | |
| 4,412,963 | 11/1983 | Hing | |
| 4,436,785 | 3/1984 | Dietz et al. | |
| 4,459,166 | 7/1984 | Dietz et al. | |
| 4,461,750 | 7/1984 | Chess et al. | 423/263 |
| 4,471,026 | 9/1984 | Nicolas et al. | |
| 4,488,673 | 12/1984 | Hopper, Jr. | |
| 4,520,116 | 5/1985 | Gentilman et al. | 501/98 |
| 4,524,138 | 6/1985 | Schwetz et al. | 501/90 |
| 4,535,029 | 8/1985 | Intrater et al. | |
| 4,543,346 | 9/1985 | Matsui et al. | 501/120 |
| 4,584,151 | 4/1986 | Matsui et al. | |
| 4,585,972 | 4/1986 | Hing | |
| 4,587,225 | 5/1986 | Tsukuma | 501/120 |
| 4,600,658 | 7/1986 | Anderson et al. | |
| 4,604,299 | 8/1986 | De Luca et al. | |
| 4,666,251 | 5/1987 | Liberman | |
| 4,701,352 | 10/1987 | De Luca et al. | |
| 4,930,731 | 6/1990 | Roy et al. | 244/316 |
| 4,983,555 | 1/1991 | Roy et al. | 501/120 |
| 5,001,093 | 3/1991 | Roy et al. | 501/120 |
| 5,082,739 | 1/1992 | Roy et al. | 428/450 |
| 5,152,940 | 10/1992 | Shibata | 264/1.2 |

OTHER PUBLICATIONS

"Transparent MgAl$_2$O$_4$ Spinel, A Broad Band Window Material for Fuzes and Guidance Systems," Roy, et al.
R. Lopez, "How the Hardware is Progressing," International Defense Review vol. 1, pp. 84–85 (1986).
"Stinger," Air Defense Artillery Magazine, Issue 1, p. 33 (1985).
P. C. Archibald, et al. "Scattering From Infrared Missile Domes," SPIE, vol. 133 pp. 71–75 (1978).
G. W. Ewing, Instrumental Methods of Chemical Analysis, 3d ed. p. 8, McGraw-Hill Book Co.
"Ultraviolet Radiation" Van Nostrands' Scientific Encyclopedia, 4th ed. pp. 1908–1909.
M. W. Benecke, et al. "Effect of LiF on Hot-Pressing of MgO", Journal of the American Ceramic Society, vol. 50, No. 7, pp. 365–368.
James R. Floyd, "Effect of Composition and Crystal Size of Alumina Ceramics on Metal-to-Ceramic Bond Strength," Ceramic Bulletin, vol. 42, No. 2 pp. 65–76.
"Joining of Ceramic-Metal Systems: General Survey," Encyclopedia of Material Science and Engineering, Michael B. Bever, ed., pp. 2463–2475 at 2470.
R. Gentilman, et al., Raytheon Company, Research Division, Waltham, Mass. 02154, "High Durability Missile Domes," Interim Technical Report for Period One, Oct. 1977 through 30 Sep. 1978.
"ASRAAM Development," International Defense Review, vol. 7, pp. 1171–1172 (1985).
M. D. Herr, et al. "Evaluation of A Statistical Fracture Criteria for Magnesium Flouride Seeker Domes," Naval Weapons Center, N.W.C. Technical Publication 6226 (1980).
C. A. Calew, et al., "The Solid State Bonding of Nickel to Alumina," Journal of Material Science, vol. 6, pp. 156–163 at 159 (1971).
"Technology Update," Ceramic Bulletin, vol. 67, No. 1, p. 64 (1988).
J. E. McDonald, et al.,. "Adhesion In Aluminum Oxide-Metal Systems," Transactions of the Metallurgical Society of AIME, vol. 233, pp. 512–517 (1965).
Encyclopedia for Material Science and Engineering, vol. 1, Bever ed., pp. 584–587, 595–611.
Kohno, et al. "Metallization of Non-Oxide Ceramics," British Ceramic Proceedings vol. 37, pp. 125–130 (1968).
Morozumi, et al. "Bonding Mechanism Between Alumina and Niobium," Journal of Materials Science, vol. 16, pp. 2137–2144 (1981).
W. J. Tomlinson, "Low Temperature Metallization of Debased Alumina," Surface and Coatings Technology, vol. 27, pp. 23–28 (1986).
M. Hirota, "X-Ray Studies on the Reaction Product formed in the Metallized Layer-Ceramic Interface of Metal-to-Ceramic Seal," Transactions—Japanese Institute of Metals, vol. 9, pp. 266–272 (1986).
"Metallizing for Ceramics," Ceramic Industry-Japan, p. 7 (Jan. 1988).
"Metallizing," Advanced Ceramics Report, p. 2 (1986).
Roy, "Development of Hot-Pressed Spinel for Mutispectral Windows and Domes", AFWAL-TR-8-1-4005, Mar. 1981, pp. 1–65.
Gatti, "Development of a Process for Producing Transparent Spinel Bodies", Final Report: Contract N00019-69-C-0133, Sep. 1969.
Gatti, et al. "Development of A Process for Producing Transparent Spinel Bodies" Final Report: Contract N0019-71-C-0126, Dec. 1971.
MIL-0-13830, pp. 32–34.
Palmour, "Development of Polycrystalline Spinel for Transparent Armor Applications", AMMRC CTR 724.
Roy, et al. "Polycrystalline MgAl$_2$O$_4$ Spinel for use as Windows and Domes from 0.3 to 6.0 Microns".
Gentilman, "Fusion-Casting of Transparent Spinel", 60 American Ceramic Society Bulletin 906 (1981).
C. Lacour, Relationship Between Thermochemical Treatment and Transparency of MgAl$_2$O$_4$ Prepared from Freeze-Dried Liquid Solutions, Science of Sintering, vol. 12, No. 1, pp. 39–48.
Stroebel, Forrest A. "Thermostructural Evaluation of Spinel Infrared (IR) Domes", Emerging Opitcal Materials S.P.I.E. vol. 297 pp. 125–136.
"Ambient Strength and Fracture Behavior of MgAl$_2$O$_4$", Rice, et al. Mechanical Behavior of Materials, 1971 International Conference, vol. IV, pp. 422–431.
Musikaut, Solomon "Development of a New Family of Improved Infrared (IR) Dome Ceramics", Emerging Optical Materials, S.P.I.E. vol. 297, pp. 2–12.

METHOD FOR PRODUCING TRANSPARENT POLYCRYSTALLINE BODY WITH HIGH ULTRAVIOLET TRANSMITTANCE

FIELD OF THE INVENTION

The present invention relates to a method of producing transparent polycrystalline body with high transmittance and, particularly, a polycrystalline body of sintered spinel with high transmittance in the ultraviolet wavelengths, produced by a closed porosity formation step, followed by a hot isostatic pressing step.

BACKGROUND INFORMATION

In a number of applications, there is need for a strong, tough, transparent window material having a high transmissivity throughout a wide range of electro-magnetic radiation. Such a window material is useful, for example, for covering a port used in connection with instrumentation for detecting electro-magnetic radiation. Materials which have been used for producing a transparent body include metal fluorides, particularly magnesium fluoride (U.S. Pat. No. 3,589,880 issued Jun 29, 1971 to Clark; U.S. Pat. No. 3,294,878 issued Dec. 27, 1966 to Carnall, Jr., et al.; U.S. Pat. No. 3,431,326 issued Mar. 4, 1969 to Letter), aluminum oxynitride (U.S. Pat. No. 4,520,116 issued May 28, 1985 to Gentilman, et al.), aluminum niobate or tantalate (U.S. Pat. No. 4,047,960 issued Sep. 13, 1977 to Reade), and solid solutions of alumina, silica and other oxides (U.S. Pat. No. 4,009,042 issued Feb. 22, 1977 to Wittler) and alumina, with minor amounts of spinel (U.S. Pat. No. 3,026,210 issued Mar. 20, 1962 to Coble).

Methods for ceramic production involving a closed porosity formation step followed by a hot isostatic pressing step have included U.S. Pat. No. 4,524,138 issued Jun. 18, 1985 to Schwertz, et al., for production of silicon carbide/boron carbide bodies and U.S. Pat. No. 4,461,750 issued Jul. 24 1984 to Chess et al., for production of ternary alkaline earth-rare earth sulfide bodies. Such methods, however, do not address the problems involved in producing a body which is transparent in the ultraviolet region and has the desired hardness and strength characteristics.

Methods have also been developed for production of transparent bodies substantially from a magnesia-alumina spinel. U.S. Pat. No. 3,974,249 issued Aug. 10, 1976 to Roy, et al., U.S. Pat. No. 3,768,990 issued Oct. 30, 1973 to Sellers, et al., U.S. Pat. No. 3,531,308 issued Sep. 29, 1970 to Bagley. Polycrystalline bodies of spinel are, in general, more easily formed than single-crystal or fusion-cast spinel or sapphire.

Previous materials and methods for production of a sintered transparent window have suffered from a number of difficulties. These materials have been deficient in transmittance in certain wavelength ranges, particularly ultraviolet ranges, for example wave lengths from about 0.2 micrometers (microns) to about 0.4 microns, as well as visible and infrared wave lengths up to about 6 microns.

Previous materials were susceptible to abrasion or erosion, for example, from high velocity impaction of dust or sand particles or rain or cloud droplets.

Previous materials were often unstable under conditions of long exposure to ultraviolet light, such that exposure to sunlight or to ultraviolet light with an intensity of about 700 microwatts/cm$^2$, on the order of 0.25 hours or more caused a reduction of the transmittance properties of the material.

Previous materials have been difficult to form with the desired structural strength. In some applications it is desired to produce a transparent window which can withstand mechanical stress on the order of a pressure of about 15 psi (0.1 MPa), but which will preferably rupture when subjected to a pressure of about 25 psi (0.17 MPa) or more.

Certain previous materials, e.g. MgO, are hygroscopic and become cloudy upon exposure to moisture, rendering the optical qualities of the material unacceptable.

Previous production methods have been costly to practice and have required a number of difficult steps making the windows impractical to produce in quantity.

Accordingly, a number of advantages would be realized by methods and materials for producing a transparent window having high transmissivity, particularly in the ultraviolet spectral region, as well as in the infrared region (e.g., about 3 to 5 microns), high resistance to erosion or abrasion, low susceptibility to deterioration from ultraviolet light, a desired degree of strength, low cost and ease of manufacture.

SUMMARY OF THE INVENTION

According to the present invention, a polycrystalline body magnesia-alumina spinel is produced having a high in-line transmittance and, particularly, a transmittance greater than that depicted by line A in FIG. 1.

The sintered transparent body is produced by a two-step process involving forming a closed porosity body in a first step and reducing residual porosity in a second step. The method comprises forming a powder of spinel, and preferably having less than 0.005 weight percent of certain impurities. The powder is formed into a closed porosity body. The closed porosity body can be formed by, e.g., hot pressing or pressureless sintering. The closed porosity body is then hot isostatic pressed at a temperature of at least about 1400° C. under a pressure of at least about 15,000 psi (about 100 MPa). A sintered body produced by this method has a grain size less than about 150 microns, a porosity less than about 0.001 percent, and, in a thickness of about 1.88 mm, an in-line transmittance greater than or equal to that depicted by line A in FIG. 1.

A body produced in accordance with this invention preferably has, in its uncoated state and with a thickness of about 1.88 mm, a transmittance greater than about 30 percent, preferably greater than 40 percent, and most preferably greater than about 45 percent, at a wavelength of about 0.2 microns and a transmittance greater than about 84 percent and preferably greater than about 85 percent at a wavelength of about 0.4 microns. The material retains at least about 90 percent and preferably at least about 99 percent of its original transmissivity after as much as 240 hours or more of exposure to ultraviolet light of a wave length between about 0.2 and about 0.4 microns. The sintered body has a flexural strength of at least about 15,000 psi (about 100 MPa) and preferably at least about 20,000 psi (about 140 MPa), most preferably at least about 28,000 psi (about 200 MPa).

In general, increased hardness and strength characteristics are associated with smaller grain sizes. A body which is transparent in the ultraviolet region as well as having the desired strength in general involves producing a body with grain sizes of about 150 microns. Substantially larger grain sizes in general result in reduced strength, while smaller grain sizes in general result in unacceptable ultraviolet transmission.

A transparent spinel body is disclosed in U.S. patent application Ser. No. 07/374,637 titled "Transparent Polycrystalline Body With High Ultraviolet Transmittance", filed on Jun. 30, 1989, which is a continuation of U.S. patent application Ser. No. 07/047,403, filed on May 6, 1987, now abandoned. A dome and window produced from transparent spinel is disclosed in U.S. patent application Ser. No. 07/363,355 titled "Dome And Window for Missles And Launch Tubes With High Ultraviolet Transmittance", filed on Jun. 2, 1989, which is a continuation of U.S. patent application Ser. No. 07/047,422, filed on May 6, 1987, now abandoned.

DETAILED DESCRIPTION OF THE PREFERRED EMBODIMENTS

According to the present invention, there is provided a sintered polycrystalline body which is highly transparent, particularly in the ultraviolet region between about 0.2 and about 0.4 microns wavelength.

The method for producing the transparent sintered body involves a two-step process. According to the method of the present invention, a magnesia-alumina spinel powder is provided. The spinel powder is of high purity, and particularly, has less than about 5 ppm by weight, preferably less than 3 ppm, of oxides of any of the following elements: Cr, Cu, Fe, Ga, Mn, Pb, Ti, V, Zn, and has less than 50 ppm, preferably less than 30 ppm of the total of all the above oxides. The powder preferably has less than 1,000 ppm, preferably less than 10 ppm of carbon, less than 10 ppm, preferably less than 5 ppm of calcium, less than 30 ppm, preferably less than 5 ppm of sodium, less than 500 ppm, preferably less than 100 ppm of sulfur, less than 1,000 ppm, preferably less than 50 ppm of silicon.

Figure 11:
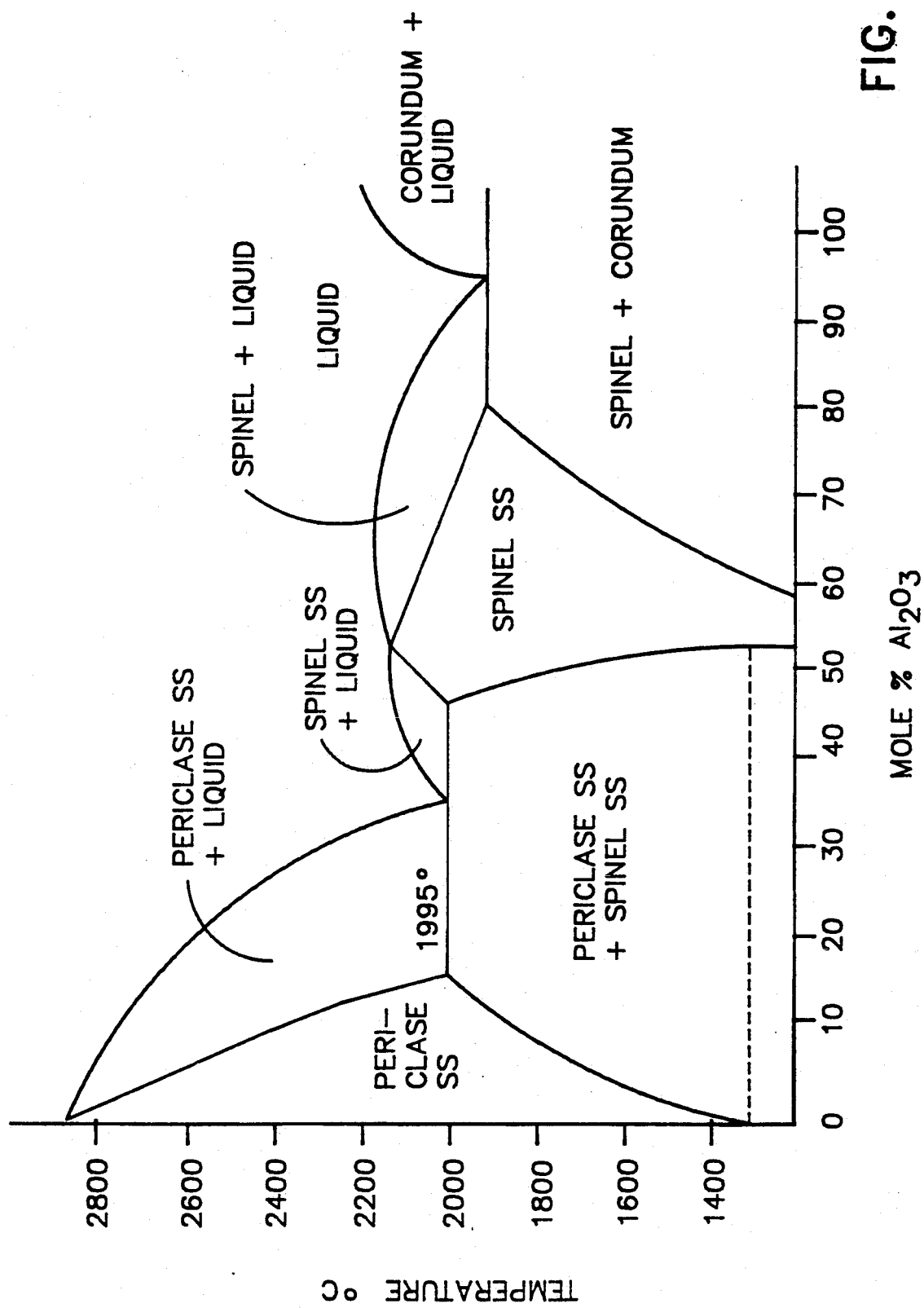
FIG. 11 depicts a phase diagram for the $MgO$-$Al_2O_3$-spinel system.

The magnesia-alumina powder is a mixture of a powder of MgO and a powder of $Al_2O_3$. The mixture can be in any weight ratio of $Al_2O_3$ to MgO approximately falling in the range indicated by "spinel SS" in FIG. 11. Preferably, the molar ratio of $Al_2O_3$ to MgO in the powder is about 1:1 plus or minus about 5 M/O. The powder preferably has a surface area of between about 15 and about 25 $m^2/g$. The average particle size of the powder is substantially submicron and preferably between 40 and 50 weight percent of the particles have a diameter less than about 1 micron.

The powder is used to form a closed porosity body. The formation of a closed porosity body is used in connection with the subsequent hot isostatic pressing step because hot isostatic pressing requires the ability to establish an elevated isostatic (usually gas) pressure outside the body, compared to the pressure in the body, e.g., the pressure of gas in the pores of the body. It is usually inconvenient to envelope or coat the body with a gas-impermeable material before hot isostatic pressing. Therefore formation of a closed porosity body (i.e., a body in which substantially no internal pores are in communication with the external atmosphere) is used to permit establishing an external pressure substantially in excess of internal pressure during the hot isostatic pressing step, as described below.

The formation of a closed porosity body can be accomplished by hot pressing or pressureless sintering. According to the hot pressing method, the powder is mixed with an amount of hot-pressing aid, e.g., between about 0.5 weight percent and about 3 weight percent, preferably about 1½ weight percent of LiF.

A suitable powder can be obtained by processing in a mortar and pestle or milling, for example, in a vibroenergy mill. Total mortar and pestle or mill time is preferably about 1 to 10 hours with the $MgAl_2O_4$ and LiF added in batches. The mortar and pestled or milled $MgAl_2O_4$ is screened preferably through a nonmetallic screen at about a 35 to 100 mesh screen size.

The mixed powder is loaded in a hot press die. The powder compacts substantially upon pressing. The thickness desired for the hot pressed parts preferably will include an allowance for grinding. For example, a finished 0.3 inch (8 mm) thick disk may require the addition of about 0.015 inch (about 0.3 mm) for grind allowance.

The hot press die may be made of graphite, for example, in the form of a cylindrical annulus. A cylindrical bottom die is placed in the bottom of the hot press die. All surfaces of the dies which will be exposed to the spinel are coated with a graphite foil.

According to one method of hot pressing, a single window is produced for each hot pressing operation. According to another hot pressing method, a number of windows are hot pressed simultaneously such as by vertically stacking two or more layers of spinel powder, separated by a parting medium such as graphite or boron nitride. When several windows are hot pressed simultaneously, the spinel layers are preferably separated by graphite spacers sufficiently thick to prevent fracture of the spacers. Spacers of about ½ inch (1.2 cm) thickness layered with 0.3–1.1 mm graphite foil are operable, although thinner spacers may also be operable. Products can be produced in a number of shapes including disks and domes.

After the powder and any parting medium is placed into the die, a top punch is placed into the top of the die. For disks, the top punch is a cylindrically-shaped punch and for domes, the top punch is preferably a male punch.

The prepared and filled die is cold pressed at about 100 psi (0.7 MPa). The cold-press pressure must be sufficient to provide for ease of handling and also assists in slightly compacting the powder prior to placing the die in the main press. The cold press pressure must not, however, be so high that closed porosity results.

The cold-pressed body can be treated to fully or partially remove impurities such as heating (at about 20° C. per minute) to about 1100° C. to about 1300° C., preferably about 1200° C. at a reduced pressure, preferably less than 100 microns Hg pressure, for about 30 minutes to remove volatile impurities. Alternatively, the impurities can be removed during the step of forming closed porosity.

After cold pressing, the die is placed in a quartz cylinder, separated therefrom by an insulating material such as graphite felt. The cold pressed bodies in the die are then subjected to hot pressing. The hot press step can be achieved in an inert gas atmosphere, but is preferably conducted under a vacuum. The actual vacuum which is achieved during hot pressing will depend in part upon the rate at which impurities or other materials out-gas. Apparatus capable of producing about 60 microns of vacuum will suffice. Note that in the discussion that follows with regard to the hot press step, the temperatures are those measured at the top surface of the die by a direct optical method. These temperatures are not necessarily equal to the temperatures of the spinel. Before any pressure is applied, the die is first heated to about 1125° C. Heating is preferably achieved by an induction heating method. The spinel is held at about 1125° C. for about 30 minutes. The pressure and temperature are then both linearly increased over a period of about 4 to 5 hours. The rate of temperature rise and the rate of pressure rise are approximately 5° C. per minute and 0.07 MPa (10 psi) per minute, respectively, and are selected such that the target temperature is never reached substantially before the target pressure is reached. For disks, the target temperature is at least about 1400° C., preferably about 1410° C. and normally not above about 1480° C. The target pressure is at least about 2000 psi (about 13 MPa), preferably about 2200 psi (about 15 MPa). For domes, the target temperature is at least about 1395° C. and preferably about 1460° C. and the target pressure is at least about 2000 psi (about 13 MPa) preferably about 3200 psi (about 22 MPa). A temperature which is too high will result in a substantial amount of sublimation of the spinel. A temperature which is too low may result in decreased transparency of the product. Pressures higher than the target pressure are believed to be operable but cause excessive wear of the dies. Pressures lower than the target pressure result in compaction less than that desired and inferior optical clarity. During hot pressing, the spinel normally loses about 3½ weight percent to sublimation.

The spinel is held at the target pressure and temperature for a period of time. The period of time for disks is about 2 to 5 hours. The period of time for domes is about 4 hours.

Following holding at the target temperature and pressure, the heating and pressure are reduced. Cooling occurs in about 12 to 14 hours. When domes are being pressed, after the die has cooled to about 1000° C., it is preferred to reduce the vacuum and to fill the die with a noble gas such as argon.

Another method for producing a closed porosity body is by pressureless sintering. Pressureless sintering, as compared to a hot press process, permits easier control of grain growth during the closed porosity formation step and is more useful in formation of parts having complex geometry. Hot-pressing is, in general, not as suitable for formation of complex-geometry parts. According to this method, the spinel powder is mixed with an amount of binder such as about 5 weight percent of carbowax, and may optionally also be mixed with materials such as surfactants, or lubricants, such as neofat. The powder mix is then compressed at substantially room temperature or is slip cast at room temperature to produce a green body. The green body is then exposed to a temperature, such as greater than about 1800° C. preferably at substantially sub-atmospheric pressure. The atmosphere during said pressureless sintering can be hydrogen or vacuum.

The closed porosity body typically has some amount of residual porosity. The hot pressed body typically has a porosity of about 0.01 volume percent or more. The pressureless sintered body typically has porosity of about 1 volume percent or more. In order to produce a body with the desired characteristics, the body is subjected to a second treatment step to reduce or eliminate the residual porosity. According to the present invention, the second step is a hot isostatic pressure treatment. The closed-porosity bodies are preferably inspected for visually-apparent defects and for minimum ultraviolet transmission such as about 65-85 percent transmission of an ultraviolet source having an intensity peak at a wavelength of about 0.25 microns. The parts, preferably separated by graphite spacers, are loaded into a hot-isostatic pressing chamber. The hot isostatic treatment includes heating the body to a target temperature of about 1500° C. to 2000° C., preferably less than about 1800° C., and at least about 1500° C. Heating can be accomplished by a resistance heater furnace The maximum temperature is achieved in an atmosphere which has been pressurized to at least about 15,000 psi (about 140 MPa). preferably more than 25,000 psi (about 170 MPa), and most preferably at least about 29,500 psi (about 205 MPa). The hot isostatic pressure atmosphere is preferably argon or helium. A number of rates of pressurization and heating and depressurization and cooling are operable. In one preferred embodiment, the chamber is pressurized to about 5,000 psi (about 34 MPa) without heating. The temperature and pressure are then increased linearly such that the target temperature and target pressure are arrived at essentially simultaneously. The heating is at a rate of between about 5° C. per minute and about 25° C. per minute, preferably about 15° C. per minute. The target temperature and target pressure are maintained for a period between about ½ hour and about 5 hours preferably about 2½ hours. In general, there is an inverse relationship between temperature and hold time, i.e., at higher temperatures, a shorter hold time will be operable. After the hold time or "soak" period, a controlled cool-down is used. The pressure is decreased linearly during the cool-down period at such a rate that when the temperature reaches 600° C., the pressure will be about 10,000 psi (about 70 MPa). The preferred cooling rate is about 5° C. per minute down to the temperature of 600° C. Too rapid cooling, such as more than about 15° C. per minute, may cause thermal shock. After a temperature of 600° C. has been achieved, the furnace is turned off. The pressure, during this period, is decreased linearly at a rate such that when the temperature is 300° C., the pressure is about 7,500 psi (about 50 MPa). At this point, the pressure is allowed to freely vent to the atmosphere and the parts are allowed to cool to a temperature at which they can be handled. Normally, there will be no weight loss of the spinel parts during the hot-isostatic pressing procedure.

In one embodiment of the process, the two steps of the process are accomplished without substantial cooling of the body between steps. According to this method, a formed but unfired compact is sintered to a closed porosity state in a vessel at about atmospheric pressure in an $H_2$ atmosphere or a sub-atmospheric pressure in a vacuum atmosphere, and at a temperature of about 1400° C. Because this process does not require a hot-press step to form the closed porosity body, it can be used in formation of bodies having complex geometry. Hot press techniques are generally not suitable for forming complex geometry bodies. After the compact is sintered to a closed porosity state, the vessel is pressurized to at least about 20,000 psi (about 140 MPa), without substantial cooling of the body, at a temperature of at least about 1400° C. to accomplish the hot isostatic pressure step of the process and reduce or eliminate residual porosity of the body. In this context, "without substantial cooling" includes maintaining the temperature above about 1000° C., preferably above about 1300° C.

Following the hot isostatic pressing step, the body is cooled and is subjected to further steps to modify the surface characteristics of the body. These further steps can include grinding and polishing, application of an anti-reflection coating and metallizing.

The grain size in the finished body is thought to be related to both the strength characteristics and the optical characteristics of the sintered body. The exact parameters of these relationships and methods for controlling grain size are not well understood. However, without wishing to be bound by any theory, it is presently believed that grain size is generally inversely related to the strength of the sintered body but is directly related to transmission characteristics at shorter wavelengths, such as ultraviolet wavelengths. In other words, it is believed that larger grain sizes produce more favorable ultraviolet characteristics but cause a decrease in the strength characteristics of the sintered body. It is also believed that the grain size of the finished body is affected by a number of factors, especially including the hot press conditions, such as soak temperature and soak time, but also, it is believed, being influenced by such factors as cooling rates, such as hot isostatic pressing cooling rates and by powder stoichiometry. It has been found that in spite of the antagonistic constraints on grain size produced by various desired qualities of the finished product, and in spite of the lack of exact knowledge regarding the numerous factors which effect grain size, a finished sintered body with the desired range of properties, particularly strength properties and transmission properties, can be produced by the described process.

The transparent body is particularly useful as an optical element in electro-optical systems that will be exposed to extreme environments such as high-abrasion, high-heat, high-stress or high-corrosion environments. Applications include missile or guided artillery components including guidance system components such as domes, windows, lenses, and prisms, as well as armor and fuse covers. The process of this invention can be used to produce bodies having a number of useful characteristics, including those described below. However, it is possible the process of this invention can produce bodies having other characteristics so that the characteristics below may but do not necessarily characterize the process.

Figure 1:
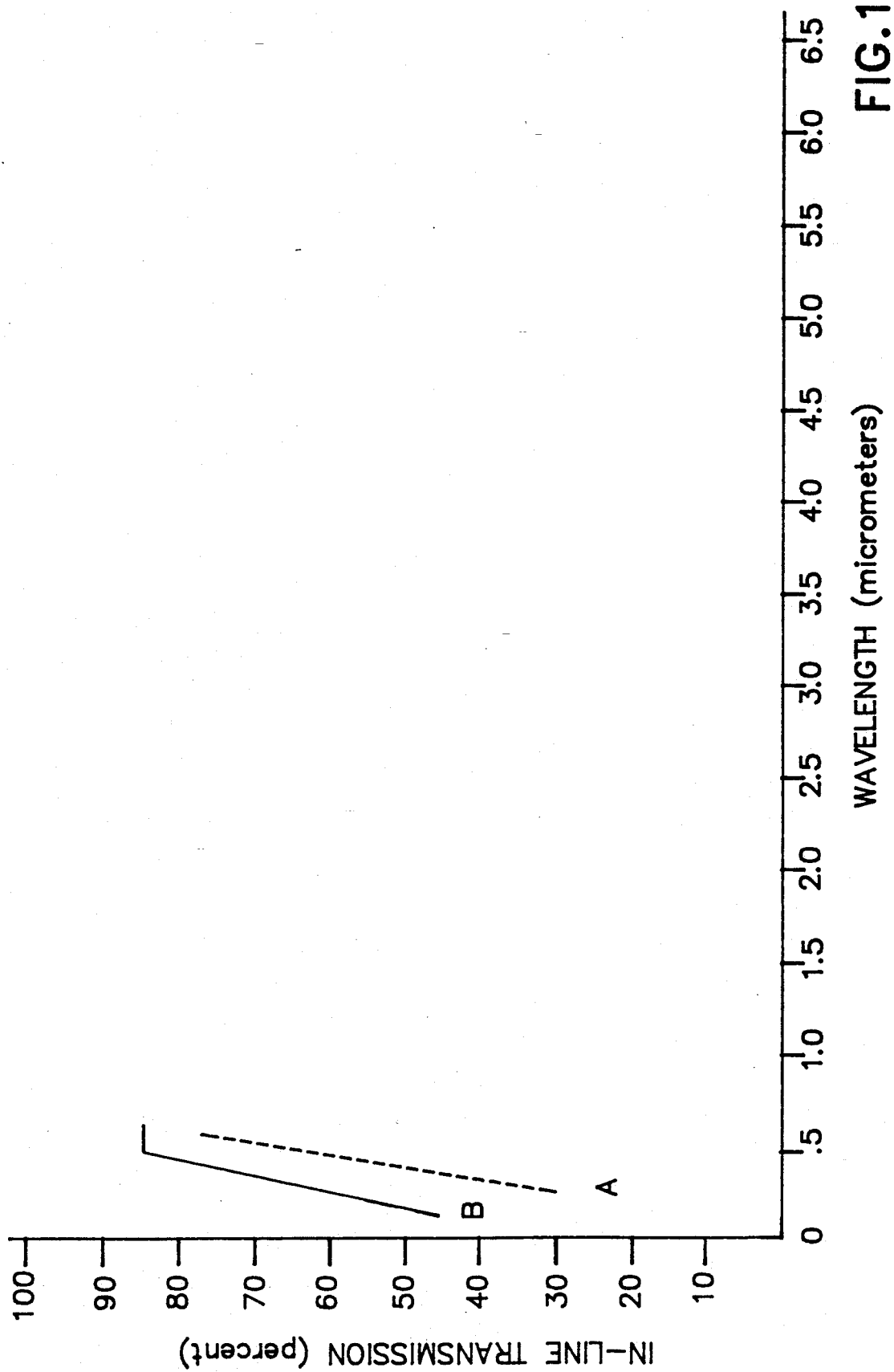
FIG. 1 illustrates a preferred and a more preferred in-line transmission of polycrystalline bodies made according to the present invention.
Figure 2:
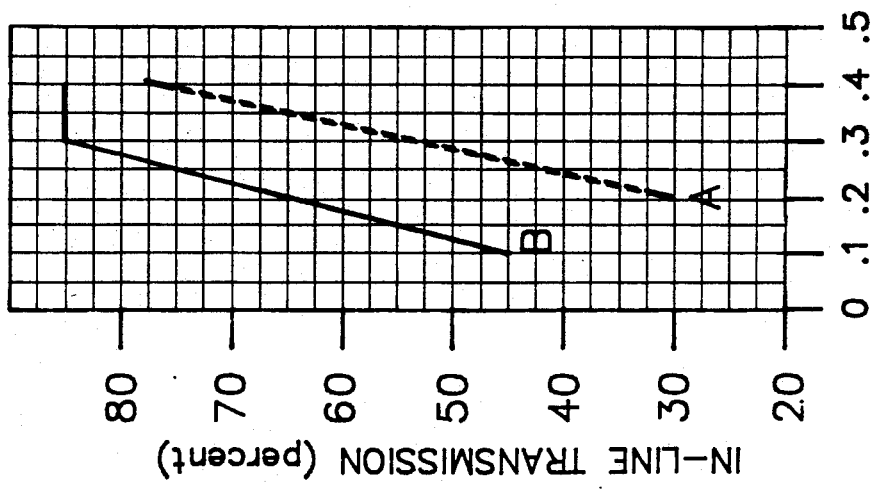
FIG. 2 depicts the transmission curves of FIG. 1 in greater detail.

Sintered bodies produced according to the present invention have an in-line transmittance greater than or equal to the transmittance depicted by line A in FIGS. 1 and 2. The methods and materials of the present invention are capable of producing a body with a transmittance even greater than that depicted by line A in FIGS. 1 and 2 and, accordingly, the present invention also includes producing a sintered body with a transmittance greater than or about equal to that depicted by line B in FIGS. 1 and 2. The sintered body of the present invention also has good transmittance in the infrared wavelength region, having an in-line transmittance per 1.88 mm thickness at all wavelengths from 3 microns to 5 microns of not less than about 73 percent, preferably not less than about 76 percent, and, at all wavelengths from about 3 microns to about 4 microns of not less than about 81 percent, preferably not less than about 84 percent.

Figure 3:
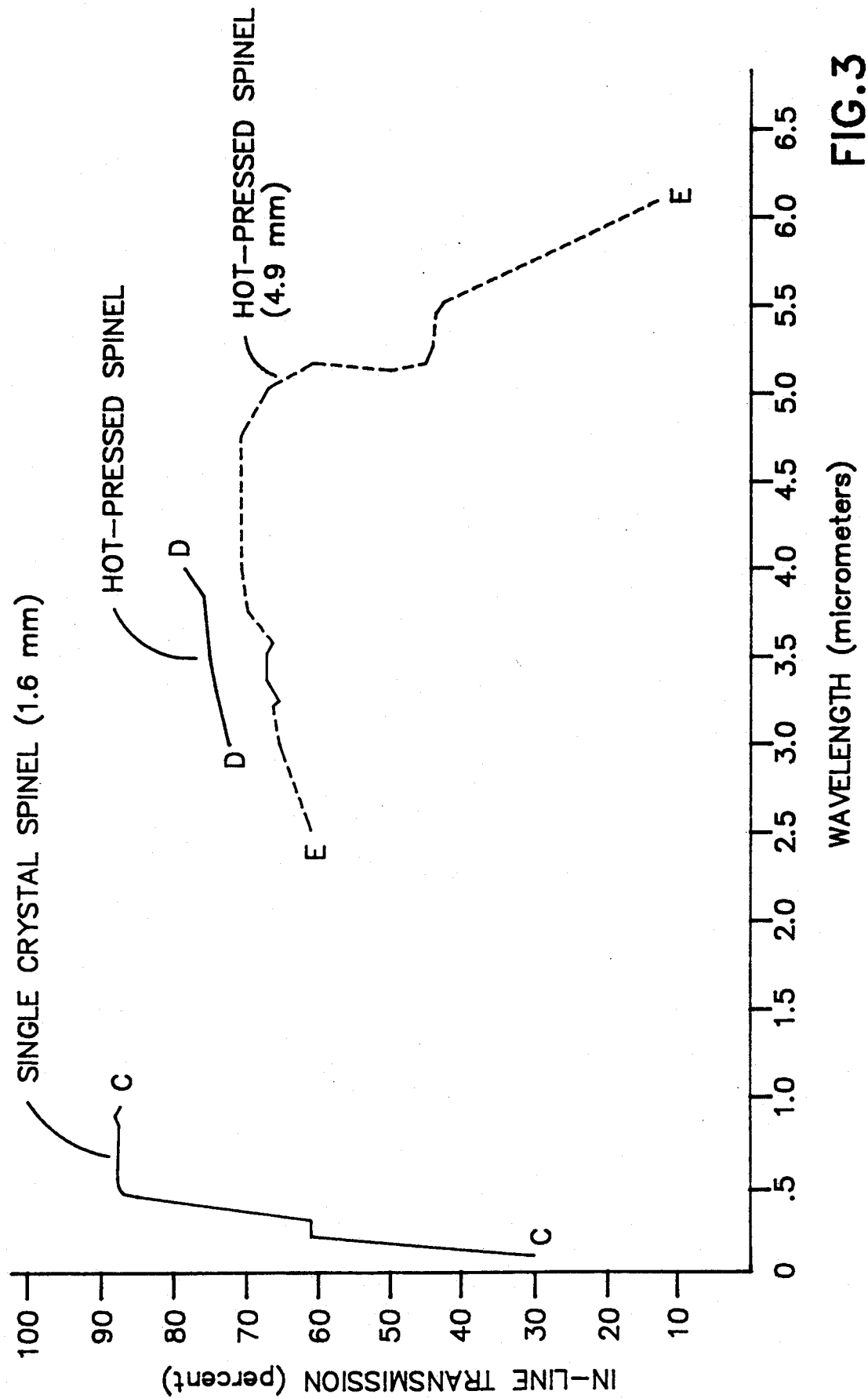
FIG. 3 illustrates spectral transmission curves of single crystal and hot-pressed spinel bodies made by methods other than those of the present invention.
Figure 4:
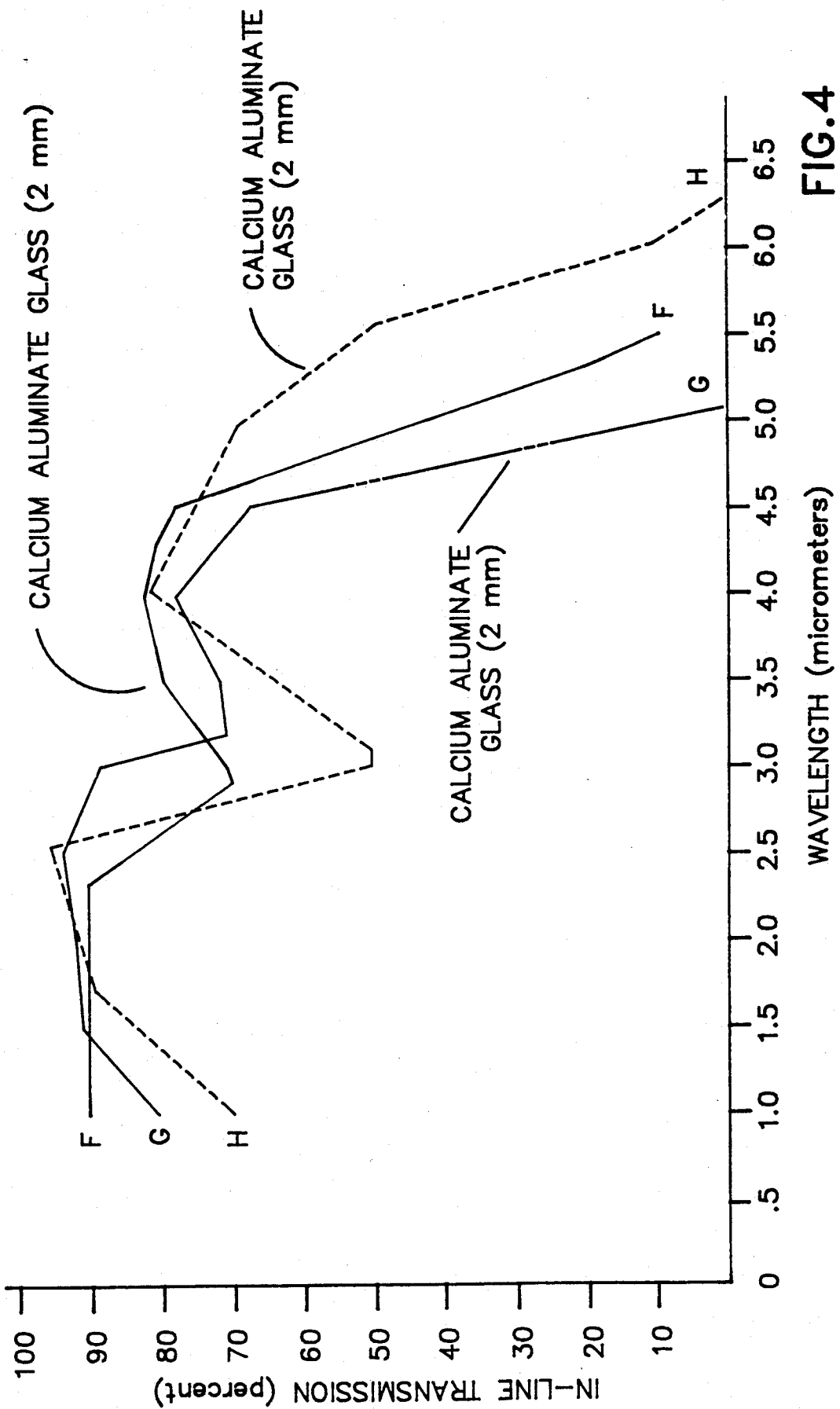
FIG. 4 illustrates spectral transmission curves of calcium aluminate glasses.
Figure 5:
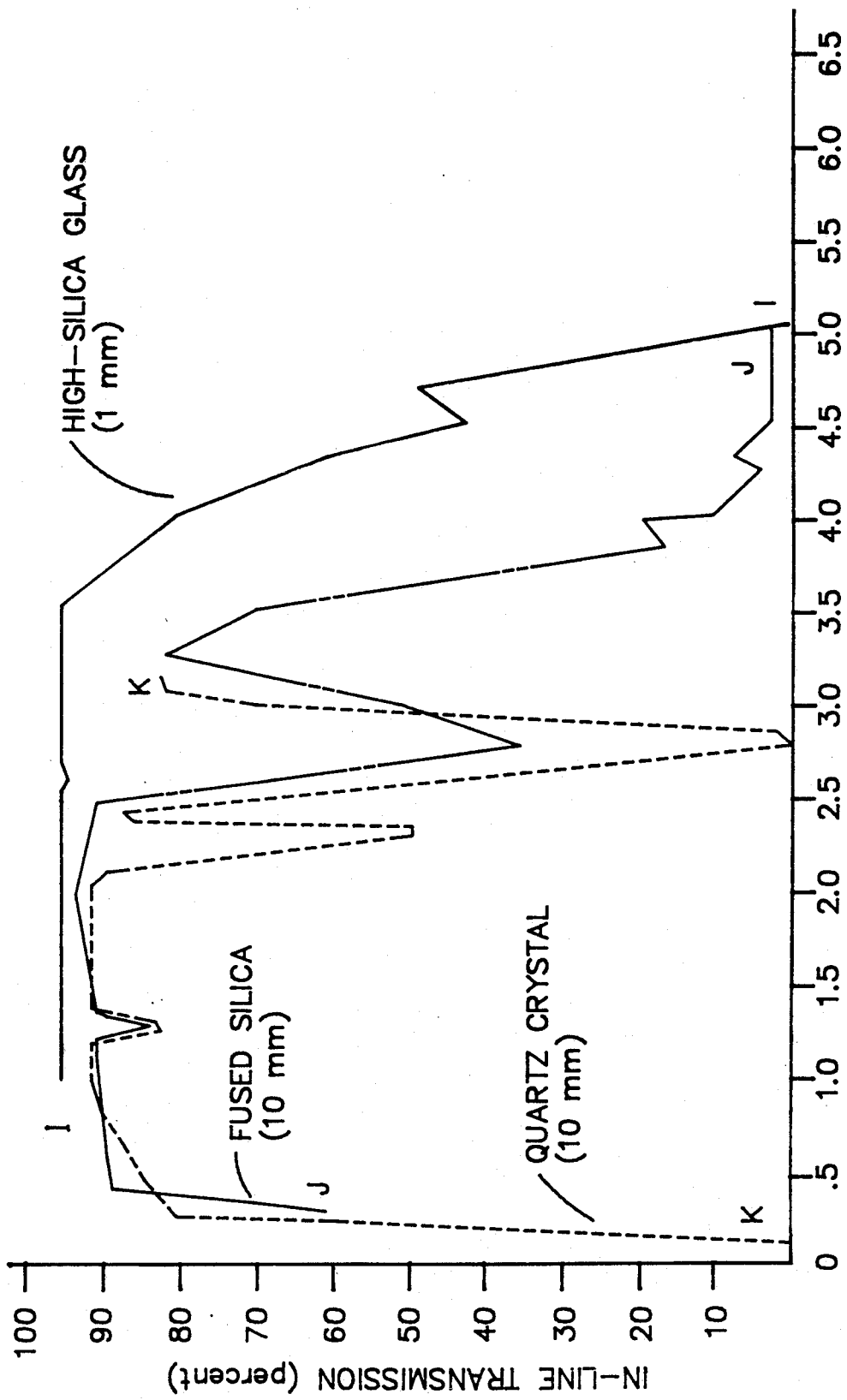
FIG. 5 illustrates spectral transmission curves of quartz crystal and silica and fused silica glass.
Figure 6:
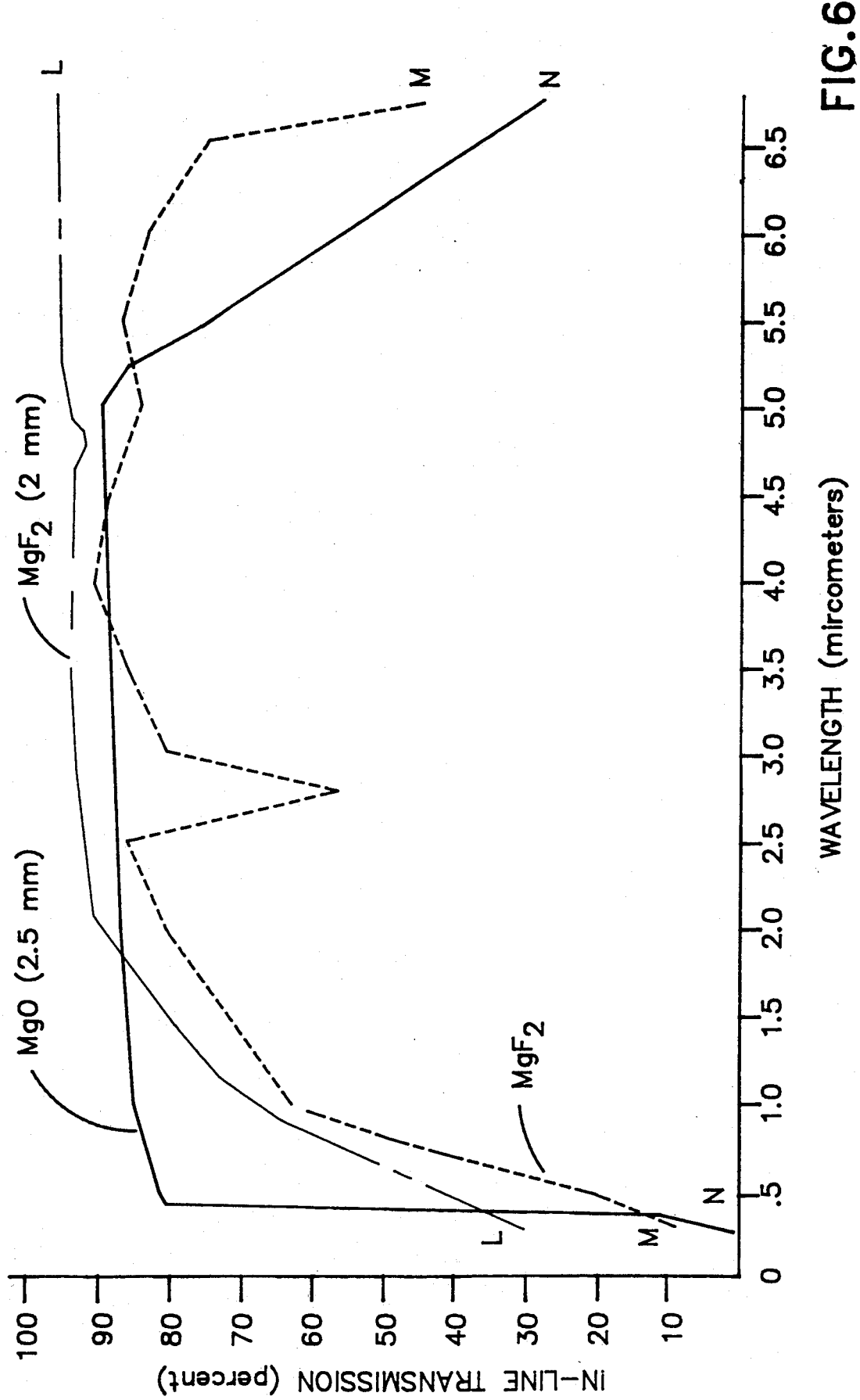
FIG. 6 illustrates spectral transmission curves of MgO and $MgF_2$.
Figure 7:
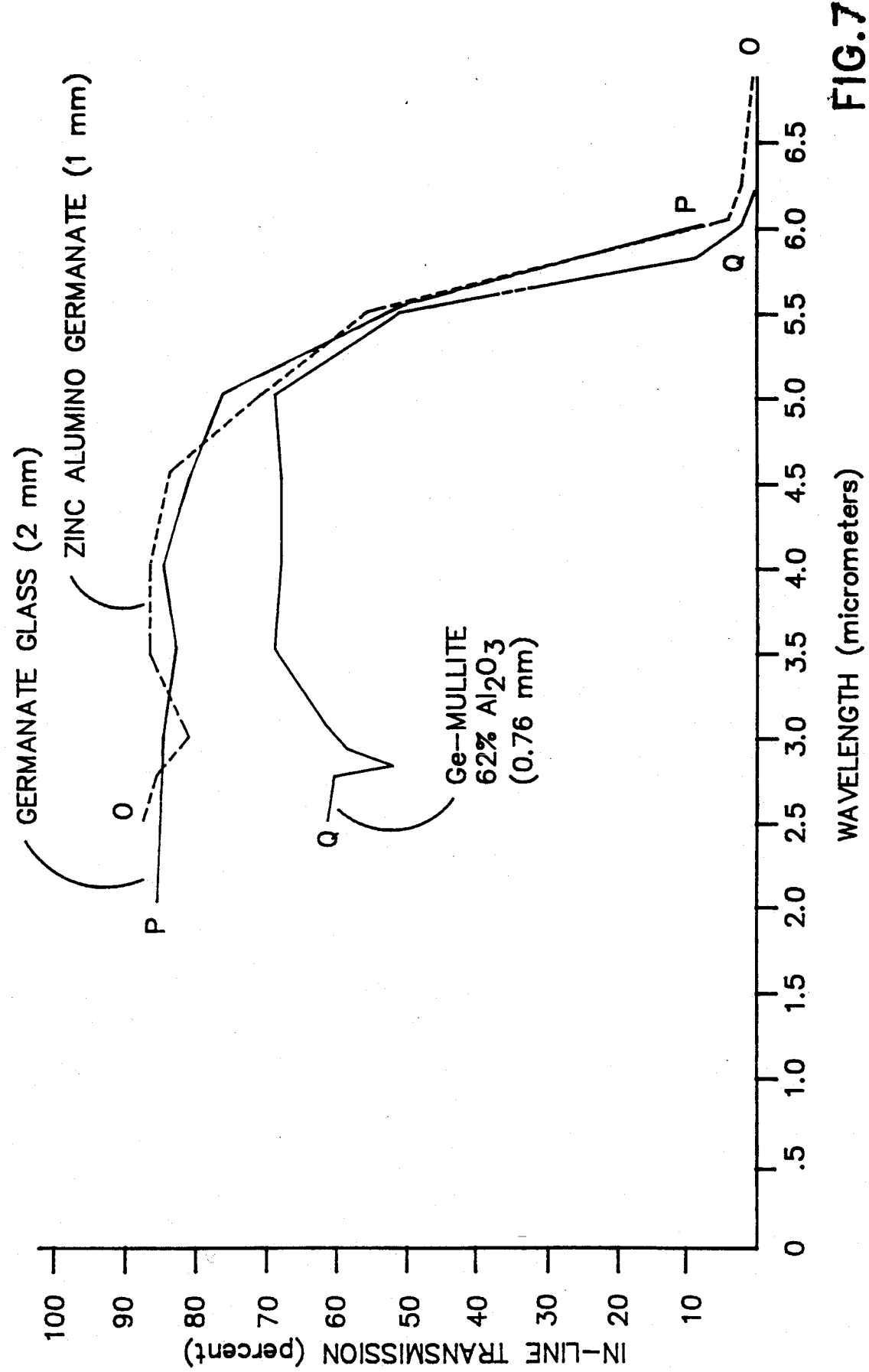
FIG. 7 illustrates spectral transmission curves of zinc alumino germanate and germanate glasses.
Figure 8:
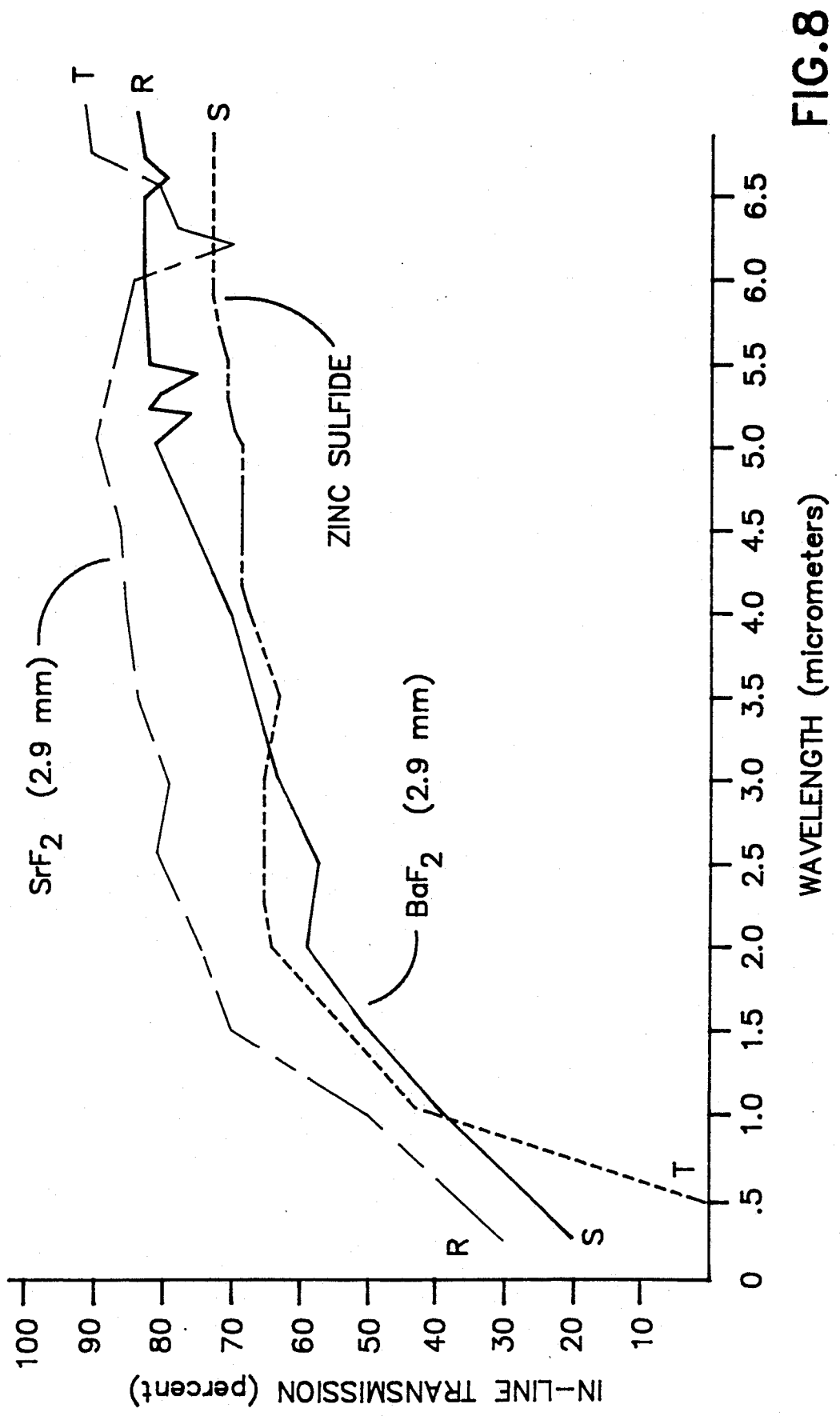
FIG. 8 illustrates spectral transmission curves of $SrF_2$, $BaF_2$, and zinc sulfide.
Figure 9:
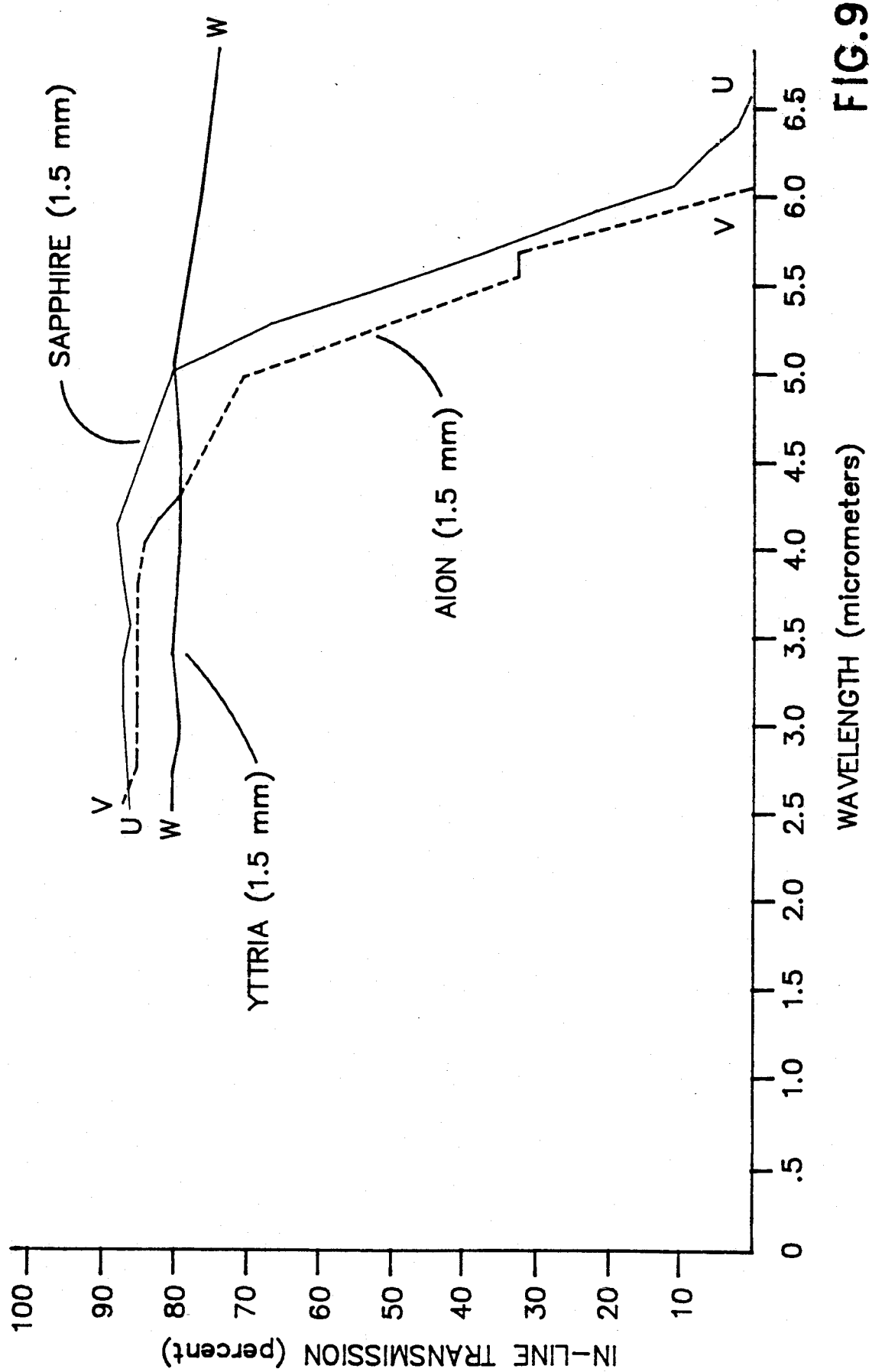
FIG. 9 illustrates spectral transmission curves of sapphire, AlON, and yttria.

Lines C through E of FIG. 3, provided for purposes of comparison, depict transmittance reported for spinal bodies produced by previous methods. Lines F through W of FIGS. 4–9 depict transmittances reported for sintered bodies made of non-spinel materials as described in Table 1, and are provided for comparison purposes.

TABLE 1

| Curve | FIG. | Material | Thickness (mm) |
|---|---|---|---|
| C | 3 | single-crystal spinel | 1.6 |
| D | 3 | hot-pressed spinel | — |
| E | 3 | hot-pressed spinel | 4.9 |
| F | 4 | calcium-aluminate glass | 2 |
| G | 4 | calcium-aluminate glass | 2 |
| H | 4 | calcium-aluminate glass | 2 |
| I | 5 | high-silica glass | 1 |
| J | 5 | fused silica | 10 |
| K | 5 | quartz crystal | 10 |
| L | 6 | $MgF_2$ | 2 |
| M | 6 | $MgF_2$ | — |
| N | 6 | MgO | 2.5 |
| O | 7 | zinc alumino germanate | 1 |
| P | 7 | germanate glass | 2 |
| Q | 7 | Ge-mullite 62% $Al_2O_3$ | 0.76 |
| R | 8 | $SrF_2$ | 2.9 |
| S | 8 | $BaF_2$ | 2.9 |
| T | 8 | zinc sulfide | — |
| U | 9 | sapphire | 1.5 |
| V | 9 | AlON | 1.5 |
| W | 9 | yttria | 1.5 |

Figure 12:
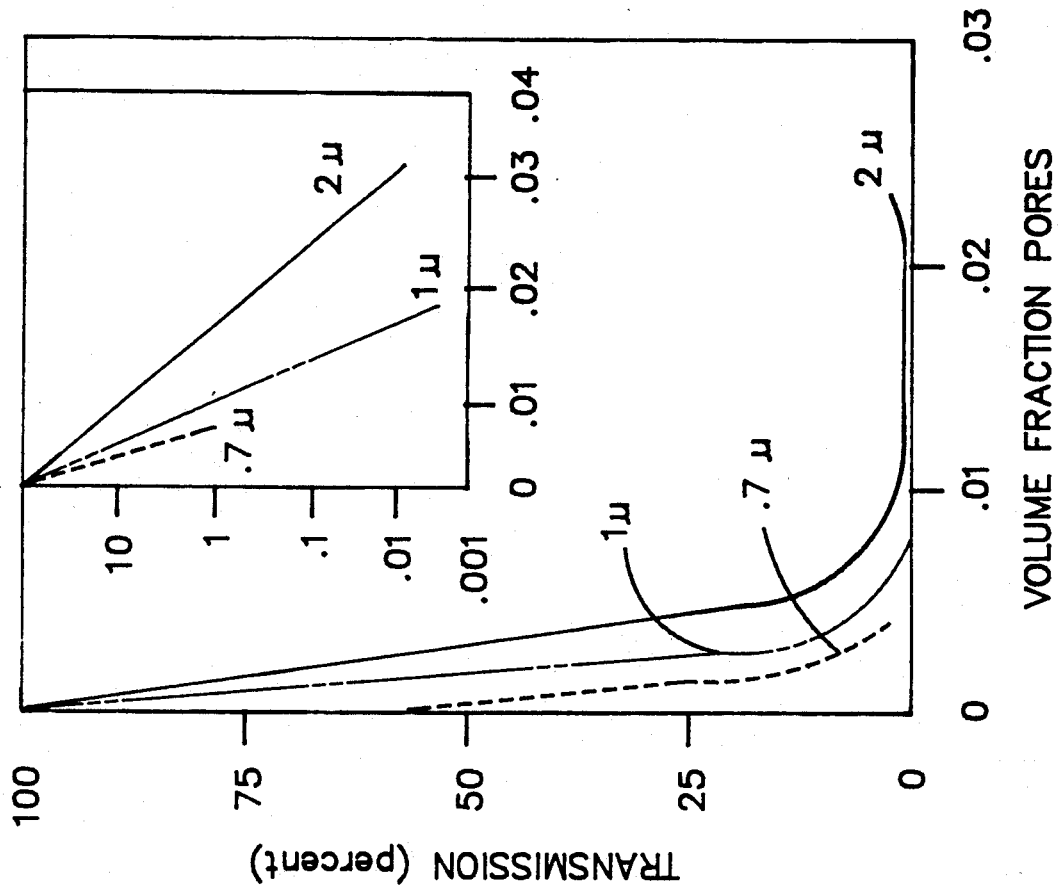
FIG. 12 illustrates a relationship between optical transmission and porosity used to obtain porosity from measurements of optical transmission.

A sintered body produced according to the present invention comprises spinel and preferably contains more than about 99.9 weight percent spinel. Spinel is a useful material for optical applications such as instrument ports because, among other reasons, spinel is non-birefringent, has a cubic structure, and is substantially non-hygroscopic. The sintered transparent body has a porosity of less than 0.01 percent, preferably less than about 0.001 percent by volume and an average pore radius less than about 0.1 microns. Porosity in such low range is difficult to measure by ordinary displacement methods. Porosity can be measured using electron micrographs of the sintered body. Another method of determining porosity is to calculate porosity from measured light transmittance, e.g. by using the graphical relationship depicted in FIG. 12, which applies generally to material such as the material which is the subject of this invention.

The polycrystalline body of the present invention has a scatter of less than about $9 \times 10^{-3}$, preferably less than about $8 \times 10^{-3}$, and most preferably less than $7 \times 10^{-3}$ at a wavelength of about 0.6471 microns.

The sintered body can be polished to a scratch-dig size of less than about 20-20. The scratch-dig size of 20-20 represents a maximum scratch size of 0.020 mm (0.0008 inches) in width and a maximum dig size of 0.20 mm (0.008 inches) in diameter. In this context, a scratch is a defect which is long and thin in nature and a dig is a defect which is basically round. The meaning of scratch-dig size is explained fully in Mil-0-13830, pp. 32-34, incorporated herein by reference. The sintered body has an average grain size less than about 150 microns. The sintered body has an average defect radius of less than about 0.005 inches (about 0.12 mm).

The sintered body of the present invention provides a relatively low emissivity in the infrared wavelength regions at elevated temperatures. High emissivities interfere with optics measurements and can be detrimental to optical guidance systems such as situations in which missile nose cones are aerodynamically heated during flight. Table 2 provides a comparison of emissivities of hot-pressed spinel with those of sapphire at various temperatures. Although the hot-pressed spinel represented in Table 2 is not made according to the claimed invention, since emissivities are primarily material-dependent, it is believed emissivities of spinel material made in accordance with the present invention has emissivities no greater than about those shown in Table 2 for hot-pressed spinel.

TABLE 2

| Temp. (°C.) | Emissivity at 4.5 and 5.0 Microns | | | |
|---|---|---|---|---|
| | Emissivity at 4.5 microns | | Emissivity at 5.0 microns | |
| | spinel | sapphire | spinel | sapphire |
| 30 | 0.078 | 0.051 | 0.157 | 0.199 |
| 200 | 0.091 | 0.074 | 0.203 | 0.268 |
| 400 | 0.118 | 0.119 | 0.280 | 0.370 |
| 600 | 0.151 | 0.168 | 0.361 | 0.477 |
| 800 | 0.194 | 0.229 | 0.461 | 0.587 |
| 1000 | 0.247 | 0.311 | 0.559 | 0.686 |
| 1200 | 0.303 | 0.381 | 0.664 | 0.777 |
| 1400 | 0.381 | 0.468 | 0.788 | 0.848 |

The sintered body of the present invention has a flexural strength, measured according to the ASTM F417 test, measured at 25° C., of at least about 15,000 psi (100 MPa), preferably at least about 20,000 psi (140 MPa), and most preferably at least about 23,000 psi (about 150 MPa). The sintered body has a tensile strength, measured according to the ACMA #4 test of at least about 12,000 psi (about 80 MPa). The material, however, is not so strong that it will resist bursting at a desired level. The sintered body of the present invention, when provided in a 3 inch (7.5 cm) diameter disk having a thickness of about 0.06 inches (1.5 mm), bursts when subjected to a pressure of more than about 25 psi (about 0.17 MPa).

The sintered body of the present invention is resistant to abrasion or erosion, and particularly, when subjected to dust, sand or water droplets at a velocity of about 500 meters per second, undergoes substantially no degradation of transmittance properties. The sintered body of the present invention has a Knoop hardness, measured according to the ASTM E18 test of greater than about 1350 kg/mm$^2$ preferably greater than about 1390.

The sintered body of the present invention is resistant to degradation under high temperature conditions and, in particular, has a high melting point, preferably above 2000° C.

The sintered body of the present invention is stable under exposure to ultraviolet light, and particularly, experiences a loss of transmissivity of less than about 1 percent after being subjected to sunlight or at a distance of about 6 inches (15 cm) to ultraviolet radiation of an intensity of about 700 microwatts/cm$^2$ having a wave length of about 0.254 microns for about 240 hours.

The sintered body of the present invention is chemically and thermally stable. The polycrystalline material of the present invention has a solubility of less than $10^{-3}$ g/100 g water at room temperature. The polycrystalline body has substantially no solubility in an acidic aqueous solution having a pH of between about 7 and about 2. There is substantially no degradation of the body upon exposure to oxidizing materials and there is substantially no degradation of the body upon exposure to temperatures of about 500° C. In this context, substantially no degradation means that the strength, hardness and optical qualities of the material are substantially preserved. In particular, upon exposure to oxidizing materials or to temperatures of about 500° C., the body possesses a knoop hardness of at least about 1038 Kg/mm$^2$, a flexure strength of at least about 15,000 psi, and in-line transmittance per 1.88 mm thickness in all wavelengths in the wavelength range from about 0.2 microns to about 0.4 microns of not less than the transmittance shown by Line A in FIG. 2.

For comparison purposes, Table 3 shows a number of physical properties reported for other optical materials.

TABLE 3

| | 4-point Flexural Strength (MPa) | Knoop Hardness 20° C. (kg/mm2) | Fracture Strength (MPa) | 550-450° C. Resistance to Thermal Stress (K/E) | 750° C. Resistance to Thermal Shock (w/cm) | Tensile Strength (MPa) | Thermal Conductivity (10-4 cal./cm sec °C.) | Melting or Softening Temperature (°C.) |
|---|---|---|---|---|---|---|---|---|
| Previous hot-pressed spinel | 103 | 1390 | 193 | 11 | 10 | 110 | 330 | 2135 |
| MgF2 | 100 | 576 | 151 | 3.2 | 9 | | | 1255 |
| MgO | 140 | 900 | 158 | 8 | 11 | | 600 | 2800 |
| Al2O3 | | 2200 | 344 | 21 | | | 600 | 2030 |
| Y2O3 | .160 | 800 | 193 | 7 | | | | |
| ZnS | | 356 | 103 | 6 | | | | |
| Fusion- | 175 | 1750 | | | | | | |

TABLE 3-continued

| | 4-point Flexural Strength (MPa) | Knoop Hardness 20° C. (kg/mm2) | Fracture Strength (MPa) | 550–450° C. Resistance to Thermal Stress (K/E) | 750° C. Resistance to Thermal Shock (w/cm) | Tensile Strength (MPa) | Thermal Conductivity (10-4 cal./ cm sec °C.) | Melting or Softening Temperature (°C.) |
|---|---|---|---|---|---|---|---|---|
| cast spinel | | | | | | | | |
| Alpha Si3N4 | | 2400 | | | | | | |
| AlON | 305 | 1950 | 206 | | | | | 2140 |
| Germinate glass | | 460 | | | | | | |

EXAMPLES

Example 1

Figure 10:
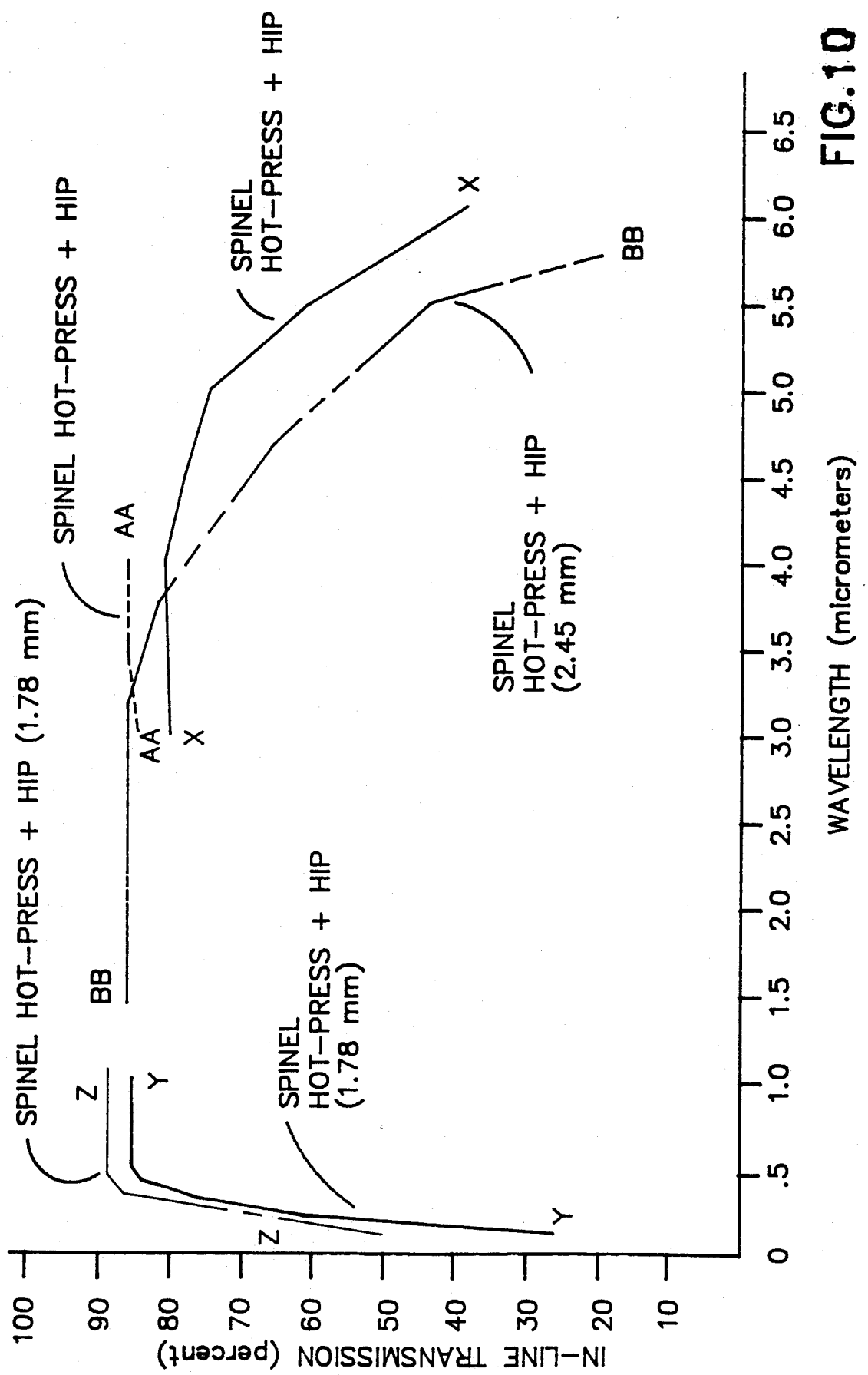
FIG. 10 illustrates spectral transmission curves of a number of samples of material made according to the present invention.

Three sintered bodies of magnesia-alumina spinel were formed and the properties thereof tested. All three bodies were formed from a powder having less than 5 parts per million by weight of oxides of any of Cr, Cu, Fe, Ga, Mn, Pb, Ti, V, and Zn and having less than 50 ppm of the total of all the above oxides. The powder had less than 1000 ppm of carbon and less than 10 ppm of calcium, less than 30 ppm sodium, less than 500 ppm sulfur, less than 1000 ppm silicon. The molar ratio of $Al_2O_3$ to MgO was 1:1. The average particle size was submicron. The powder was mixed with 1½ weight percent LiF. The powder was loaded in a graphite die and cold-pressed at about 100 psi (0.7 MPa). The cold-pressed body was hot pressed at a temperature of about 1410° C. with a uniaxial pressure of about 2200 psi (15 MPa) with a "soak" of 5 hours. After cooling, the bodies were hot isostatically pressed at a temperature of 1500° C. and a pressure of 29,500 psi. After cooling, the bodies were polished. The transmission spectrum characteristic of the three bodies are shown in FIG. 10.

Example 2

Bodies of calcium aluminate glass and bodies of spinel, the latter formed according to the process of the invention, as described in Example 1, were subjected to sunlight and an artificial ultraviolet light source, Model UVL-56 manufactured by Ultra-Violet, Inc. of San Gabriel, Calif., for periods of time indicated in Table 4. The transmission of the bodies at a wavelength of about 0.254 microns is also shown in Table 4 before such exposure to ultraviolet light and after such exposure to ultraviolet light.

TABLE 4

| Type of Body | Length of Exposure (hours) | Light Source | Transmission Before U.V. Exposure | Transmission After U.V. Exposure |
|---|---|---|---|---|
| Calcium-aluminate glass | 2 | Sunlight | 70 | 45 |
| | ½ | Artificial | 70 | 68 |
| Spinel | 244 | Sunlight | 78 | 78 |
| | 115 | Artificial | 78 | 76 |

Example 3

To assess the damage from sand erosion, samples of material formed according to the present invention, along with plexiglass and window glass were mounted on a rotating table and blasted with 10 pounds of abrasive grit. The percent haze after the test was measured using an integrating sphere. The results are shown in Table 5.

TABLE 5

| Material | Percent Haze After Sandblast Test |
|---|---|
| Spinel - Hot press + HIP | 8 |
| Plexiglass - 1 | 79 |
| Plexiglass - 2 | 74 |
| Window Glass | 82 |

Example 4

The Agile Rain Erosion Test, as described in Memo REG. 4062-137-72 "Rain Erosion Test of Proposed Dome Materials" was performed on the material produced according to the present invention as well as a number of other materials including $MgF_2$, $CaF_2$, Yttrium-Aluminum-Garnet, MgO, and two glasses, Vycor 7913 and Corning 1723. The materials were placed in a sample holder and attached to an accelerated sled achieving the velocities indicated in Table 6. Results of the test are shown in Table 6. Table 7 shows the resistance to damage of the materials tested in order to relative effectiveness.

TABLE 6

| Material | Thickness of $Al_2O_3$ Coating (microns) | Run No. | Velocity (km per hr/fps) | Description |
|---|---|---|---|---|
| Spinel-hot-press + HIP | None | 1 | 29/1600 | No appreciable |
| | None | 3 | 25.5/1400 | No damage |
| | None | 4 | 29/1600 | No damage |
| $MgF_2$ | None | 1 | 29/1600 | Completely shattered |
| | None | 2 | 29/1600 | Completely shattered |
| | None | 3 | 25.5/1400 | One surface crack |
| | None | 4 | 29/1600 | Complete breakage |
| | 2.1 | 4 | 29/1600 | Surface cracks with coating deterioration |
| | 3.9 | 4 | 29/1600 | Coating slightly deteriorated |
| $CaF_2$ | None | 1 | 29/1600 | Slight pitting with surface cracks & fractures throughout although sample intact |
| | None | 2 | 29/1600 | Surface cracks with pitting |
| | None | 4 | 29/1600 | Surface cracks with slight pitting |
| | 2.1 | 4 | 29/1600 | Coating gone - slight pitting with surface cracks |
| MgO | None | 1 | 29/1600 | Surface cracks |
| | None | 2 | 29/1600 | Complete breakage |
| Sapphire | None | 2 | 29/1600 | Single line |

TABLE 6-continued

| Material | Thickness of Al₂O₃ Coating (microns) | Run No. | Velocity (km per hr/fps) | Description |
|---|---|---|---|---|
| | None | 3 | 25.5/1400 | fracture No damage |
| Yttrium-Aluminum-Garnet | None | 1 | 29/1600 | Single line fracture |
| | None | 3 | 25.5/1400 | No damage |
| Corning 1723 | | 2 | 29/1600 | Completely shattered |
| | | 3 | 25.5/1400 | Pitting with surface cracks |
| VyCor 7913 | | 2 | 29/1600 | Completely shattered |
| | | 3 | 25.5/1400 | Surface pitting with one surface crack |

TABLE 7

Agile Rain Erosion Test Resistance To Damage
(In Order Of Relative Effectiveness)

| 1 | Spinel; Hot-press + HIP |
|---|---|
| 2 | Sapphire |
| 3 | Yttrium-Aluminum-Garnet |
| 4 | MgF₂ with coating |
| 5 | CaF₂ with coating |
| 6 | MgO |
| 7 | CaF₂ |
| 8 | MgF₂ |
| 9 | VyCor 7913 |
| 10 | Corning 1723 |

Although the present invention has been described with reference to certain embodiments, it should be appreciated that further modifications can be effected within the spirit and scope of the invention as limited only by the appended claims.

What is claimed is:

1. A process for producing a sintered polycrystalline body wherein said body has an in-line transmittance per 1.88 mm thickness in all wavelengths in the wavelength range from about 0.2 microns to abut 0.4 microns of not less than the transmittance shown by Line B in FIG. 2 comprising:

providing a powder comprising at least 97 weight percent magnesia-alumina spinel, said magnesia-alumina spinel powder comprising less than about 50 ppm of oxides selected from the group consisting of oxides of chromium, copper, iron, gallium, manganese, lead, titanium, vanadium, and zinc, and combinations thereof;

producing a closed porosity body from said powder; and hot isostatic pressing said closed porosity body to at least about 1400° C. at elevated pressure of at least about 20,000 psi to reduce residual porosity.

2. A process as claimed in claim 1, wherein said producing step comprises:

hot pressing said powder at a temperature of more than about 1400° C. and a pressure of more than about 2,000 psi.

3. A process as claimed in claim 1, wherein said producing step comprises:

pressureless sintering said powder at a temperature greater than about 1800° C. and at a pressure less than about atmospheric pressure.

4. A process, as claimed in claim 1, further comprising:

reducing impurities content of said powder by heating to a temperature greater than about 1100° C. and at a pressure less than about atmospheric pressure.

5. A process, as claimed in claim 1, further comprising:

maintaining said closed porosity body at a temperature of at least about 1000° C. continuously from the completion of said step of producing said closed porosity body until initiating said step of hot isostatic pressing said closed porosity body.

6. A process, as claimed in claim 1, wherein:

said hot isostatic pressing step comprises heating at a rate between about 5° C. per hour and about 25° C. per hour.

7. A process as claimed in claim 1, further comprising:

maintaining said closed porosity body at a temperature of at least about 1400° C. and a pressure of at least about 20,000 psi for a period of at least one-half hour.

8. A process, as claimed in claim 1, further comprising:

cooling said body, after said hot isostatic pressing step, at a rate less than about 15° C. per minute to a temperature of about 600° C.

9. A process for producing a sintered polycrystalline body consisting essentially of magnesia-alumina spinel wherein said body has an in-line transmittance per 1.88 mm thickness in all wavelengths in wavelength range of from about 0.2 microns to about 0.4 microns of not less than the transmittance shown by line A in FIG. 2, comprising:

providing a powder consisting essentially of magnesia-alumina spinel, said magnesia-alumina spinel powder comprising less than about 50 ppm of oxides selected from the group consisting of oxides of chromium, copper, iron, gallium, manganese, lead, titanium, vanadium, and zinc, and combinations thereof;

producing a closed porosity body from said powder; and hot isostatic pressing said closed porosity body at an elevated temperature of at least about 1400° C. and at a pressure of at least about 20,000 psi for a time effective to produce a sintered body having a porosity less than about 0.001 volume percent.

10. A process, as claimed in claim 9, wherein said step of producing a closed porosity comprises:

hot pressing said powder at a temperature more than about 1400° C. and a pressure of more than about 2,000 psi.

11. A process, as claimed in claim 9, wherein said step of producing a closed porosity body comprises:

pressureless sintering said powder at a temperature greater than about 1800° C. and at a pressure less than about atmospheric pressure.

12. A process as claimed in claim 9, wherein: said sintered body has a knoop hardness of at least about 1350 kg mm⁻².

13. A process as claimed in claim 9, wherein:

said sintered body has a flexural strength of at least about 15,000 psi.

14. A sintered polycrystalline body consisting essentially of magnesia-alumina spinel wherein said body has an in-line transmittance per 1.88 mm thickness in all wavelengths in the wavelength range from about 0.2 microns to about 0.4 microns of not less than the transmittance shown by Line B in FIG. 2 produced by a process comprising:

produce a powder comprising magnesia-alumina spinel, said magnesia-alumina spinel powder comprising less than about 50 ppm of oxides selected from the group consisting of oxides of chromium, copper, iron, gallium, manganese, lead, titanium, vanadium, and zinc, and combinations thereof;

producing a closed porosity body from said powder; and hot isostatic pressing said closed porosity body at a temperature of at least about 1400° C. and at a pressure of at least about 20,000 psi to reduce residual porosity.

15. A sintered polycrystalline body, as claimed in claim 14, wherein:
said body has a flexural strength of at least about 15,000 psi.

16. A sintered polycrystalline body, as claimed in claim 14, wherein:
said sintered body has a knoop hardness of at least about 1350 kg mm$^{-2}$.

17. A sintered polycrystalline body, as claimed in claim 14, wherein:
said body has a grain size less than about 150 microns.

18. A sintered polycrystalline body, as claimed in claim 14, wherein:
said body has a tensile strength of at least about 12,000 psi.

19. A sintered polycrystalline body, as claimed in claim 14, wherein:
said body has a strength such that a 3 inch diameter disk having a thickness of about 0.06 inches bursts when subjected to a pressure of more than about 25 psi.

20. A process as claimed in claim 1 wherein said providing step comprises providing a magnesia-alumina spinel powder comprising a mixture of a powder of MgO and a powder of $Al_2O_3$.

21. A process as claimed in claim 24 wherein said mixture comprises a molar ratio of $Al_2O_3$ to MgO in the range of approximately 0.95:1 to approximately 1:0.95.

22. A process as claimed in claim 1 wherein said providing step comprises providing a magnesia-alumina powder having a surface area of between about 15 and about 25 square meters per gram.

23. A process as claimed in claim 1 wherein said providing step comprises providing a powder having a particle size distribution wherein between about 40 and about 50 weight percent of the particles have a diameter of less than about 1 micron.

24. A process as claimed in claim 1 wherein said providing step comprises providing a powder comprising up to 3 weight percent lithium fluoride.

25. A process as claimed in claim 1 wherein said powder comprises less than about 5 ppm by weight of oxides of any of the elements selected from the group consisting of Cr, Cu, Fe, Ga, Mn, Pb, Ti, V, and Zn, and has less than 50 ppm of all of the above oxides total, and has less than 1000 ppm of carbon, less than 10 ppm of calcium, less than 30 ppm of sodium, less than 500 ppm of sulfur, and less than 1000 ppm of silicon.

26. A process as claimed in claim 9 wherein said powder comprises less than about 5 ppm by weight of oxides of any of the elements selected from the group consisting of Cr, Cu, Fe, Ga, Mn, Pb, Ti, V, and Zn, and has less than 50 ppm of all of the above oxides total, and has less than 1000 ppm of carbon, less than 10 ppm of sulfur, and less than 1000 ppm of silicon.

27. A process as claimed in claim 14 wherein said powder comprises less than about 5 ppm by weight of oxides of any of the elements selected from the group consisting of Cr, Cu, Fe, Ga, Mn, Pb, Ti, V, and Zn, and has less than 50 ppm of all of the above oxides total, and has less than 1000 ppm of carbon, less than 10 ppm of calcium, less than 30 ppm of sodium, less than 500 ppm of sulfur, and less than 1000 ppm of silicon.

28. A process as claimed in claim 1 wherein said sintered polycrystalline body comprises at least about 99.9 weight percent magnesia-alumina spinel.

29. A process as claimed in claim 9 wherein said sintered polycrystalline body comprises at least about 99.9 weight percent magnesia-alumina spinel.

30. A process as claimed in claim 14 wherein said sintered polycrystalline body comprises at least about 99.9 weight percent magnesia-alumina spinel.

* * * * *